United States Patent
Abumi

(10) Patent No.: US 7,814,254 B2
(45) Date of Patent: Oct. 12, 2010

(54) MODE SETTING METHOD AND SYSTEM IN HOT PLUG OF PCI DEVICE

(75) Inventor: Koji Abumi, Yamanashi (JP)

(73) Assignee: NEC Computertechno, Ltd., Kofu-Shi, Yamanashi (JP)

( * ) Notice: Subject to any disclaimer, the term of this patent is extended or adjusted under 35 U.S.C. 154(b) by 165 days.

(21) Appl. No.: 12/042,863

(22) Filed: Mar. 5, 2008

(65) Prior Publication Data

US 2008/0222335 A1    Sep. 11, 2008

(30) Foreign Application Priority Data

Mar. 8, 2007   (JP)   ............... 2007-059079

(51) Int. Cl.
*G06F 13/00*   (2006.01)
(52) U.S. Cl. .................. 710/302; 710/300
(58) Field of Classification Search ......... 710/300–306, 710/308–317
See application file for complete search history.

(56) References Cited

U.S. PATENT DOCUMENTS

| | | | | |
|---|---|---|---|---|
| 6,098,132 | A * | 8/2000 | Olarig et al. ............... | 710/302 |
| 6,311,242 | B1 * | 10/2001 | Falkenburg et al. ........ | 710/301 |
| 6,928,498 | B2 * | 8/2005 | Eichler et al. .............. | 710/104 |
| 7,136,955 | B2 * | 11/2006 | Su et al. .................... | 710/313 |
| 7,246,190 | B2 * | 7/2007 | Nguyen et al. ............. | 710/306 |
| 7,406,549 | B2 * | 7/2008 | Ong et al. .................. | 710/62 |
| 2005/0160207 | A1 * | 7/2005 | Chen et al. ................. | 710/74 |
| 2007/0168574 | A1 * | 7/2007 | Martinez et al. ........... | 710/15 |
| 2008/0155222 | A1 * | 6/2008 | Hasegawa .................. | 711/173 |

FOREIGN PATENT DOCUMENTS

| | | |
|---|---|---|
| JP | 11175456 A | 7/1999 |
| JP | 2000259546 A | 9/2000 |
| JP | 2000276258 A | 10/2000 |
| JP | 2001084218 A | 3/2001 |
| JP | 2001168892 A | 6/2001 |
| JP | 2002032324 A | 1/2002 |
| JP | 2002278913 A | 9/2002 |
| JP | 2002288104 A | 10/2002 |
| JP | 2003046511 A | 2/2003 |
| JP | 2005317021 A | 11/2005 |
| JP | 2006146921 A | 6/2006 |

OTHER PUBLICATIONS

Japanese Office Action dated Jan. 6, 2009 for Patent Application No. 2007-059079.

* cited by examiner

*Primary Examiner*—Raymond N Phan

(57) ABSTRACT

The invention is to provide a mode setting method and a system including a PCI bus in the hot plug of a PCI device which is capable of supporting a platform unique function for a PCI device that is hot-added. Therefore, in a system including a PCI bus according to an exemplary embodiment of the invention, a south bridge directly notifies firmware that a PCI device is hot-added and thus, it is possible to support the platform unique function for the hot-added PCI device without modifying an OS or an open hot plug driver.

8 Claims, 6 Drawing Sheets

MODE SETTING METHOD AND SYSTEM IN HOT PLUG OF PCI DEVICE

This application is based upon and claims the benefit of priority from Japanese patent application No. 2007-059079, filed on Mar. 8, 2007, the disclosure of which is incorporated herein in its entirety by reference.

BACKGROUND OF THE INVENTION

1. Field of the Invention

The present invention is a mode setting method and a system including a PCI bus in the hot plug of a PCI device.

2. Description of the Related Art

A system including a PCI bus according to the present invention will be described below.

FIG. 7 is a block diagram of the system including a PCI bus according to the present invention, and FIG. 8 is a block diagram of a PCI control circuit according to the present invention.

As shown in FIG. 7, the system including a PCI bus according to the present invention does not include a config read command issuing circuit and a hot add control circuit but includes a processor 101, a north bridge 102, a south bridge 104 including a PCI control circuit 110, a PCI slot 105, and a firmware 103.

As shown in FIG. 8, the PCI control circuit according to the present invention does not include a config access retry control circuit but includes a PCI bus control circuit 201 and a mode register 202 (Japanese Unexamined Patent Application Publication Nos. 2000-276258, 2003-046511, 2006-146921, and h11-175456).

The hot-adding of a PCI device is notified only to an OS (operating system) or a hot plug driver from the south bridge, but the hot-adding can not be notified to the firmware 103 without modifying the OS or the hot plug driver.

The above-mentioned hot add method in the system according to the present invention has the following problems.

First problem is that since it is difficult to request to modify a OS or an open hot plug driver or to make a hot plug driver by a user, it is not possible to support a platform unique function for a PCI device that is hot-added during the system is operated, though it is possible to support the platform unique function for the PCI device that has been incorporated into the system when it's booted.

Second problem is that hardware and firmware cannot determine the timing when config access to the hot-added PCI device is available and thus cannot read a vendor ID or a device ID of the hot-added PCI device.

Third problem is that, config access cannot be interrupted by hardware or firmware because if the config access from hardware or firmware competes with the config access from the processor, some PCI devices cannot operate and be controlled.

For these reasons, in a system capable of hot-adding a PCI device, a mode setting method and a system including a PCI bus in the hot plug of a PCI device, which is capable of supporting the platform unique function for a PCI device that is hot-added during the system is operated by allowing to notify the hot-adding of a PCI device to firmware that controls the platform unique function and by allowing the firmware to easily recognize a vendor ID and a device ID of the hot-added PCI device.

SUMMARY OF THE INVENTION

The invention is designed in view of the above fact, and an exemplary object of the invention is to provide a mode setting method and a system including a PCI bus in the hot plug of a PCI device which is capable of supporting a platform unique function for a PCI device that is hot-added during the operation of the system, which is the exemplary object mentioned above.

In order to achieve the exemplary object, the invention has the following characteristics.

<Mode Setting Method>

An exemplary aspect of a mode setting method in the hot plug of a PCI device according to the invention is the method that includes notifying the hot add of the PCI device to firmware from a south bridge.

Another exemplary aspect of a mode setting method in the hot plug of a PCI device according to the invention is the method including: notifying the hot add of the PCI device at a south bridge of a system including a PCI bus to firmware from the south bridge; and automatically reading information of a vendor ID and a device ID of the hot-added PCI device, which is required for the mode setting, from the PCI device and transmitting the information to the firmware by the south bridge, thereby allowing to set the mode of a platform unique function to support the PCI device that is hot-added to the system.

<System Including PCI Bus>

An exemplary aspect of a system including a PCI bus is a system that includes a mode setting unit that controls a south bridge to notify firmware that a PCI device is hot-added.

Another exemplary aspect of a system including a PCI bus according to the invention is a system including: a PCI bus; firmware; a PCI device; and a south bridge that notifies the firmware that the PCI device is hot-added, automatically reads information of a vendor ID and a device ID of the hot-added PCI device, which is required for mode setting, from the PCI device, and transmits the information to the firmware.

DESCRIPTION OF THE EXEMPLARY EMBODIMENTS

First Exemplary Embodiment

[Description of Configuration]

According to a mode setting method in the hot plug of PCI device according to a first exemplary embodiment of the invention, in an SB of a system including a PCI bus, the SB notifies firmware (FW) that a PCI device is hot-added and the SB automatically reads information of a VID and a DID of the hot-added PCI device, which is required for the mode setting, from the PCI device and transmits the information to the FW and thereby it is made possible to set the mode of a platform unique function to support the PCI device that is hot-added to the system, without making a dedicated hot plug driver.

Figure 1:
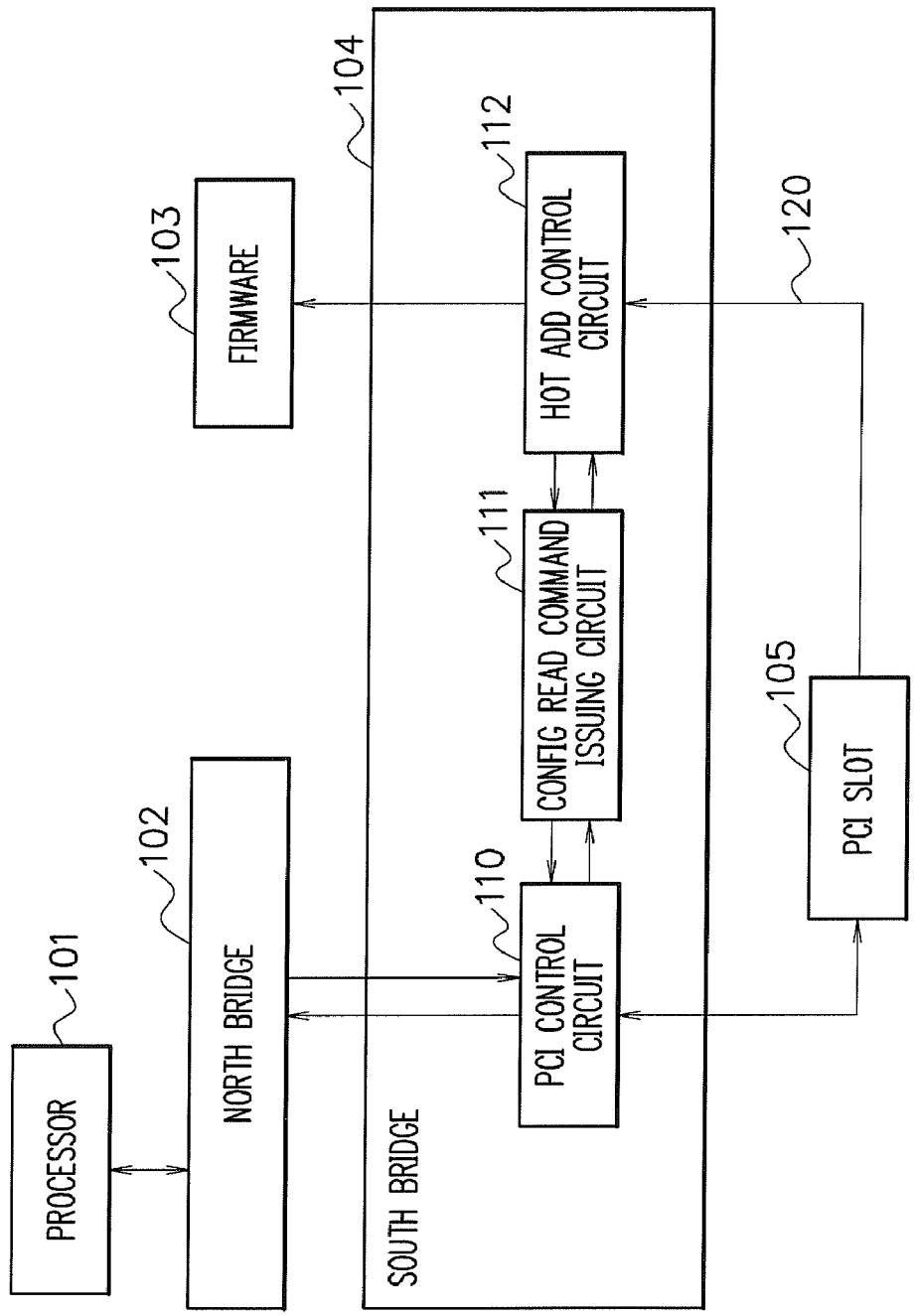
FIG. 1 is a block diagram illustrating a system including a PCI bus according to an exemplary embodiment of the invention.

FIG. 1 is a block diagram illustrating a system including a PCI bus according to a first exemplary embodiment of the invention.

The system shown in FIG. 1 includes a processor 101, a north bridge (hereinafter, referred to as NB) 102, an SB 104, and a PCI slot 105, and the platform unique function is controlled by an FW 103.

The SB 104 includes: a PCI control circuit 110 that controls issues of commands from the processor 101 to a PCI device on the PCI slot 105 or controls issues of commands from the PCI device; a config read command issuing circuit 111 that issues config read commands for reading a vendor ID (VID) and a device ID (DID) of the PCI device; and a hot add control circuit 112 that, when a PCI device is hot-added to the PCI slot 105, instructs to issue the config read command or notifies the FW 103 of interruptions of the hot add. In addition, an electric acknowledge signal 120 on the PCI slot 105 is connected to the hot add control circuit 112 other than the PCI bus.

Figure 2:
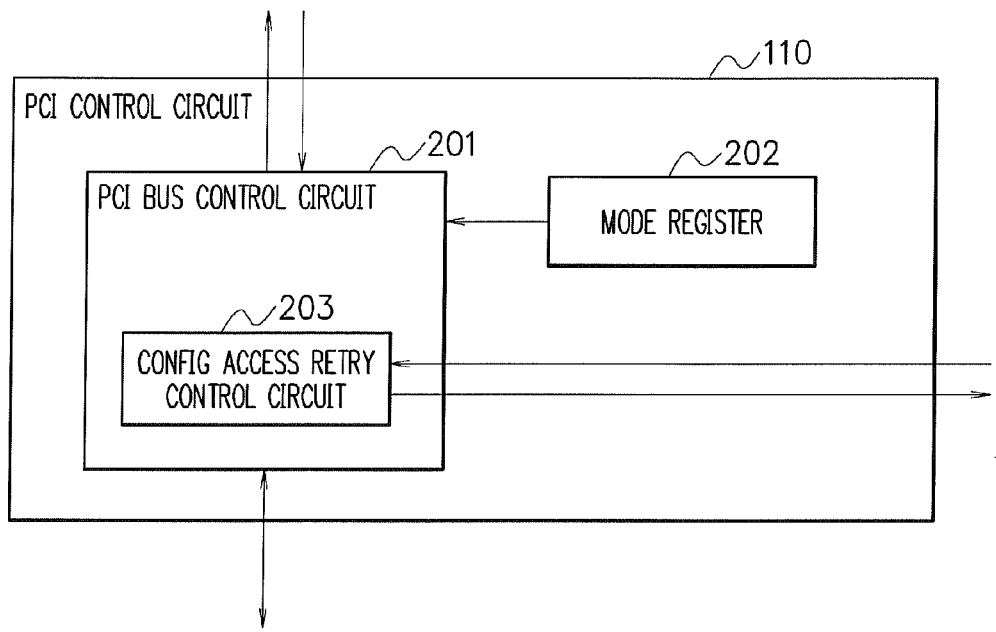
FIG. 2 is a detailed diagram illustrating a PCI control circuit 110 used in the system shown in FIG. 1.

FIG. 2 is a detailed diagram illustrating the configuration of the PCI control circuit 110 used in the system shown in FIG. 1.

In FIG. 2, the PCI control circuit 110 includes a PCI bus control circuit 201 that controls issues of commands to the PCI device on the PCI slot 105 and controls the reception of commands from the PCI device and a mode register 202 that sets the support of the platform unique function for the PCI device.

The PCI bus control circuit 201 includes a config access retry control circuit 203 that, when the config read command issuing circuit 111 requests to issue the config read commands, does not issue the config access command issued from the processor 101 to the PCI device on the PCI slot 105 to the PCI bus, but returns the config access command to the processor 101 as a retry of the issue of the config access command.

Figure 3:
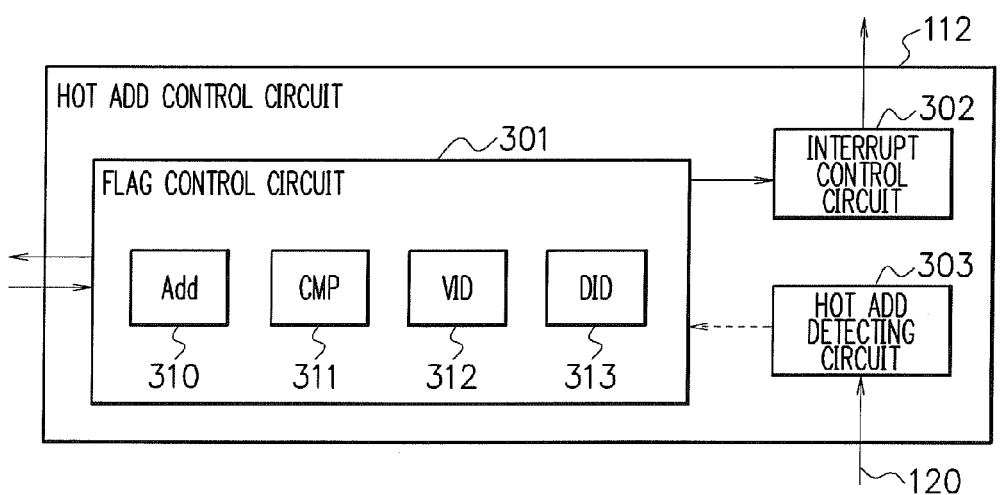
FIG. 3 is a detailed diagram illustrating a hot add control circuit 112 used in the system shown in FIG. 1.

FIG. 3 is a detailed diagram illustrating the configuration of the hot add control circuit 112 used in the system shown in FIG. 1.

In FIG. 3, the hot add control circuit 112 includes a flag control circuit 301 that manages a flag register for managing a sequence during hot add and a register for storing the VID and DID of a PCI device, an interrupt control circuit 302 that interrupts for notifying the FW 103 of the hot add, and a hot add detecting circuit 303 that detects the hot add of a PCI device to the PCI slot 105 on the basis of the electric acknowledge signal 120 from the PCI slot 105.

The flag control circuit 301 includes an add flag 310 that is set when a PCI device is hot-added to the PCI slot 105, a CMP flag 311 that is set when reading of the VID and DID from the PCI device is completed, and a VID register 312 and a DID register 313 that store the VID and the DID read from the PCI device, respectively.

Although the first exemplary embodiment of the invention has been described above in detail, a detailed description of the processor 101, the NB 102, and other functions of the SB 104 will not be described here since such functions are well known to those skilled in the art and they are not directly related to the invention.

Further, in this exemplary embodiment, a case, in which one PCI slot 105 is connected to the SB 104 shown in FIG. 1, is explained, however more number of slots may be connected to the SB 104. In this case, the number of hot add control circuits 112 and the number of mode registers 202 of the PCI control circuit 110 provided in the SB 104 shown in FIG. 1 may correspond to the number of PCI slots.

[Description of Operation]

The operation of the system shown in FIG. 1 and the operation of the control circuits provided in the south bridge shown in FIGS. 2 and 3 will be described below.

When a PCI device is hot-added to the PCI slot 105 connected to the SB 104 while the system is being operated, it is notified to the SB 104 by the electric acknowledge signal 120.

The SB 104 notified of hot add by the electric acknowledge signal 120 recognizes the hot add of the PCI device by the hot add detecting circuit 303 in the hot add control circuit 112.

When the hot add is detected, it is notified to the flag control circuit 301 from the hot add detecting circuit 303, and only the add flag 310 is set to "1" out of the add flag 310 and the CMP flag 311 with an initial value of "0" inside thereof.

When the config read command issuing circuit 111 recognizes from the flag control circuit 301 that the value of the add flag 310 is "1" and the value of the CMP flag 311 is "0", it prepares config read commands for reading the VID and DID of the PCI device on the PCI slot 105, and requests the PCI bus control circuit 201 of the PCI control circuit 110 to issue the config read commands.

The PCI bus control circuit 201 having received the request to issue the config read command waits until config access commands are issued from the processor 101 to the PCI device on the PCI slot 105.

When a PCI device is hot-added to the PCI slot 105, a PCI hot plug controller interrupts the processor 101 to notify an OS or a hot plug driver that the PCI device is hot-added to the PCI slot 105.

When the hot add of the PCI device to the PCI slot 105 is notified, the OS and the hot plug driver set up the NB 102, the SB 104 and the PCI device on the PCI slot 105 in order to incorporate the PCI device on the PCI slot 105 into the system.

When the config access commands can be issued to the PCI device on the PCI slot 105 by setting up the OS or the hot plug driver, the config access commands are issued from the processor 101 to the PCI device on the PCI slot 105.

The PCI bus control circuit 201 of the SB 104 on the path can recognize that the config access commands can be issued to the PCI device on the PCI slot 105 by receiving the config access commands transmitted from the processor 101 to the PCI device on the PCI slot 105.

Therefore, since the config read command issuing circuit 111 requests to issue the config read commands, the PCI bus control circuit 201 does not issue the config access commands from the processor 101 to the PCI bus, but returns a retry response to the processor 101 as an instruction to issue the commands again by the config access retry control circuit 203, and issues config read commands for reading the VID and DID of the PCI device on the PCI slot 105, which are from the command issuing circuit 111, to the PCI bus.

While issuing the config read commands from the config read command issuing circuit 111 to the PCI device on the PCI slot 105, the config access command, for which retry has been returned, is reissued from the processor 101. However, since the config read command from the config read command issuing circuit 111 is being processed, the config access retry control circuit 203 returns the retry response to the processor 101 again, and this process is continued until process of the config read command from the config read command issuing circuit 111 is completed.

When reply data in response to the config read command from the config read command issuing circuit 111 are returned from the PCI device on the PCI slot 105, the PCI bus control circuit 201 outputs replay data to the config read command issuing circuit 111 to control the config access retry control circuit 203 to stop a retry process of config access from the processor 101 to the PCI device on the PCI slot 105. Then, the config access command received afterward from the processor 101 to the PCI device on the PCI slot 105 is normally output to the PCI bus, and then issued to the PCI device on the PCI slot 105.

The config read command issuing circuit 111 forwards the reply data to the hot add control circuit 112 without any change, and the hot add control circuit 112 receiving the reply data sets the CMP flag in the flag control circuit 301 to "1" and stores VID and DID information items read from the PCI device on the PCI slot 105 in the VID register 312 and the DID register 313, respectively.

When recognizing that the value of the hot add flag 310 is "1" and the value of the CMP flag 311 is "1" from the flag control circuit 301, the interrupt control circuit 302 of the hot add control circuit 112 performs interruption to notify the FW 103 that the PCI device is hot-added to the PCI slot 105.

When the hot add of the PCI device to the PCI slot 105 is notified, the FW 103 reads each flag included in the hot add control circuit of the SB 104 to recognize the position of the PCI slot from the add flag 310 and the type of the PCI device that is hot-added to the PCI slot 105 from the VID register 312 and the DID register 313. The FW 103 determines whether the support of the platform unique function is available and determines the support content on the basis of the recognized type of PCI device, and sets the mode of a support function to the mode register 202 in the PCI control circuit 110 of the SB 104. After the mode is set, the support of the platform unique function is available for the PCI device that is hot-added to the PCI slot 105.

Second Exemplary Embodiment

[Description of Configuration]

Figure 4:
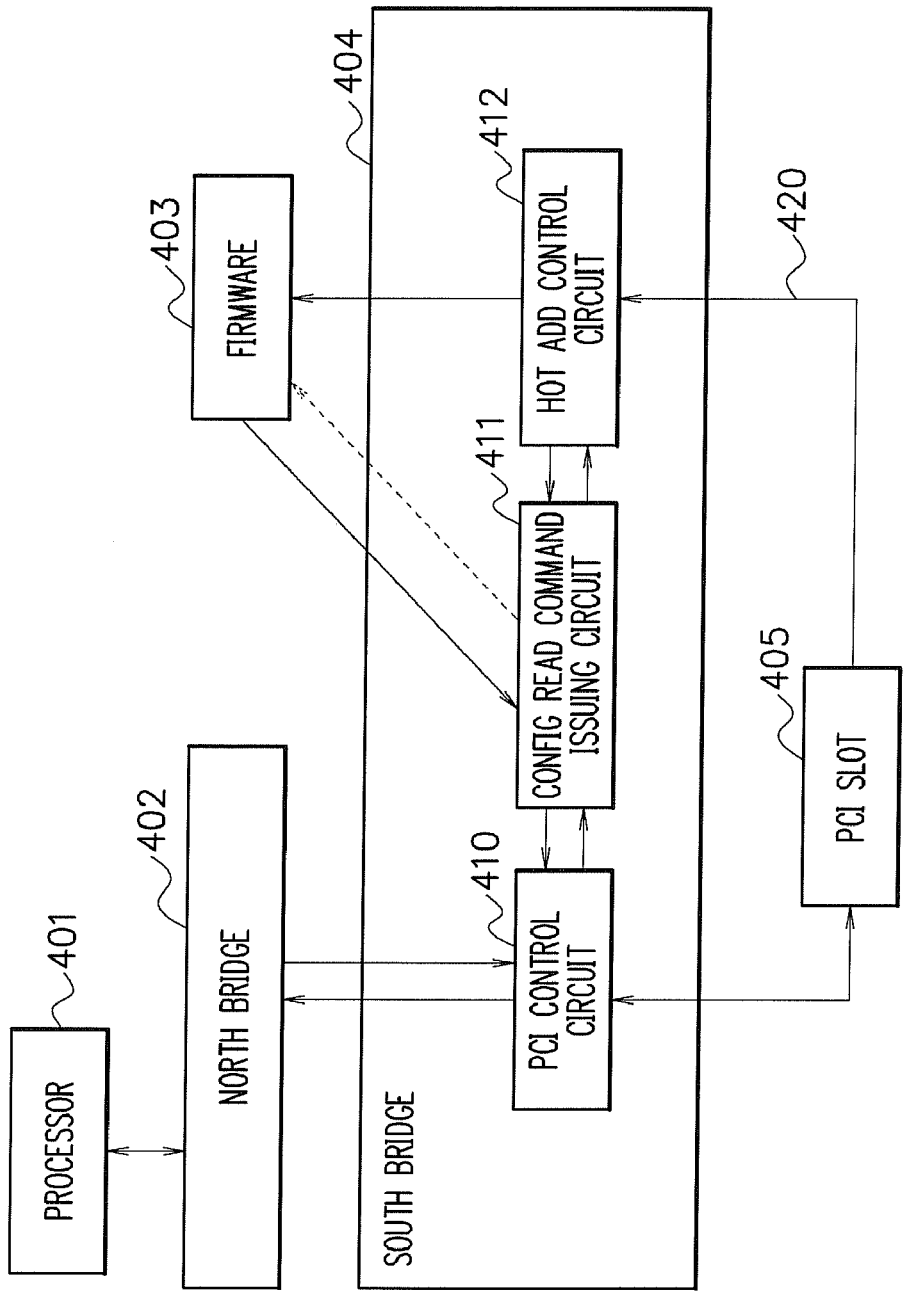
FIG. 4 is a block diagram illustrating a system including a PCI bus according to another exemplary embodiment of the invention.

FIG. 4 is a block diagram illustrating a system including a PCI bus according to another exemplary embodiment of the invention.

In FIG. 4, the system includes a processor 401, an NB 402, a SB 404, and a PCI slot 405, and the platform unique function is controlled by an FW 403.

The SB 404 includes: a PCI control circuit 410 that controls the issue of commands from the processor 401 to a PCI device on the PCI slot 405 or controls the issue of commands from the PCI device; a config read command issuing circuit 411 that issues config read commands to the PCI device according to instructions from the FW 403; and a hot add control circuit 412 that, when a PCI device is hot-added to the PCI slot 405, instructs to issue the config read command or notifies the FW 403 of interruptions of the hot add. In addition, an electric acknowledge signal 420 on the PCI slot 405 is transmitted to the hot add control circuit 412 other than the PCI bus.

Figure 5:
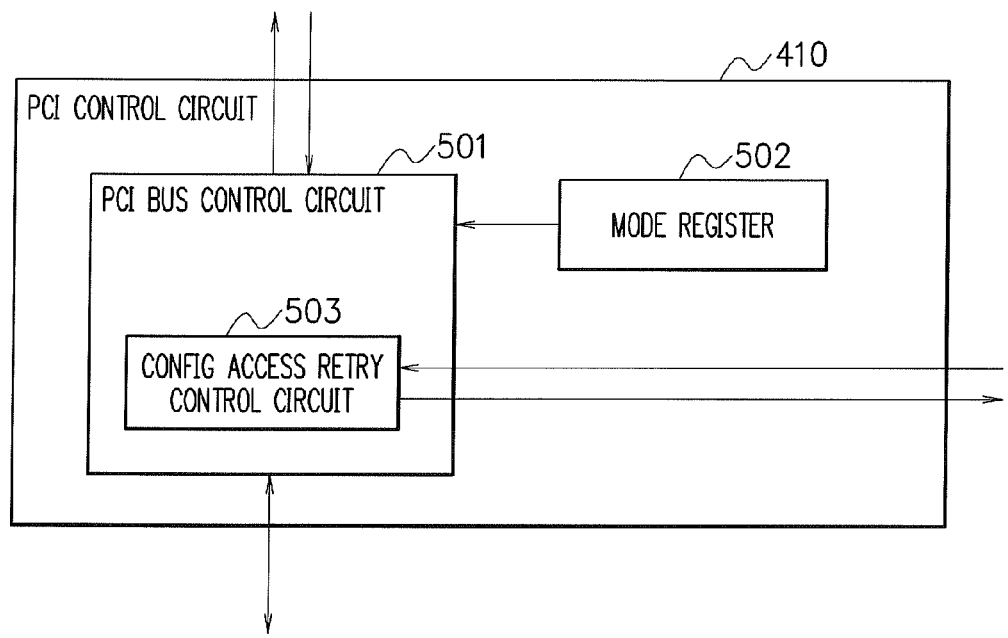
FIG. 5 is a detailed diagram illustrating a PCI control circuit 410 used in the system shown in FIG. 4.

FIG. 5 is a detailed diagram illustrating the configuration of the PCI control circuit 410 used in the system shown in FIG. 4.

The configuration of the PCI control circuit shown in FIG. 5 is substantially the same as that of the PCI control circuit shown in FIG. 2. In FIG. 5, the PCI control circuit 410 includes a PCI bus control circuit 501 that controls the issue of commands to a PCI device on the PCI slot 405 and controls the reception of commands from the PCI device and a mode register 502 that sets the support of the platform unique function for the PCI device.

The PCI bus control circuit 501 includes a config access retry control circuit 503 that, when the config read command issuing circuit 411 requests to issue the config read commands, does not issue the config access command issued from the processor 401 to the PCI device on the PCI slot 405 to the PCI bus, but returns the config access command to the processor 401 as a retry of the issue of the config access command.

Figure 6:
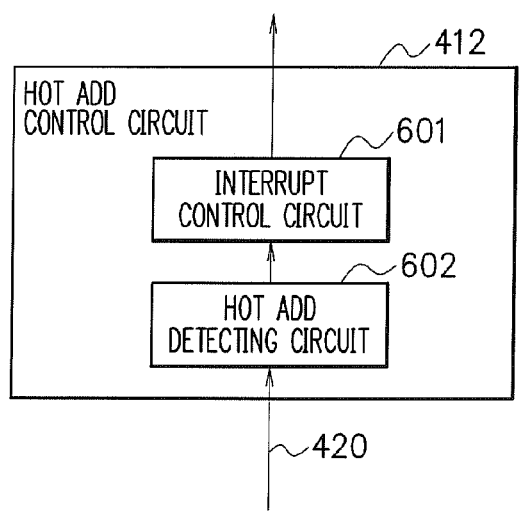
FIG. 6 is a detailed diagram illustrating a hot add control circuit 412 used in the system shown in FIG. 4.
Figure 7:
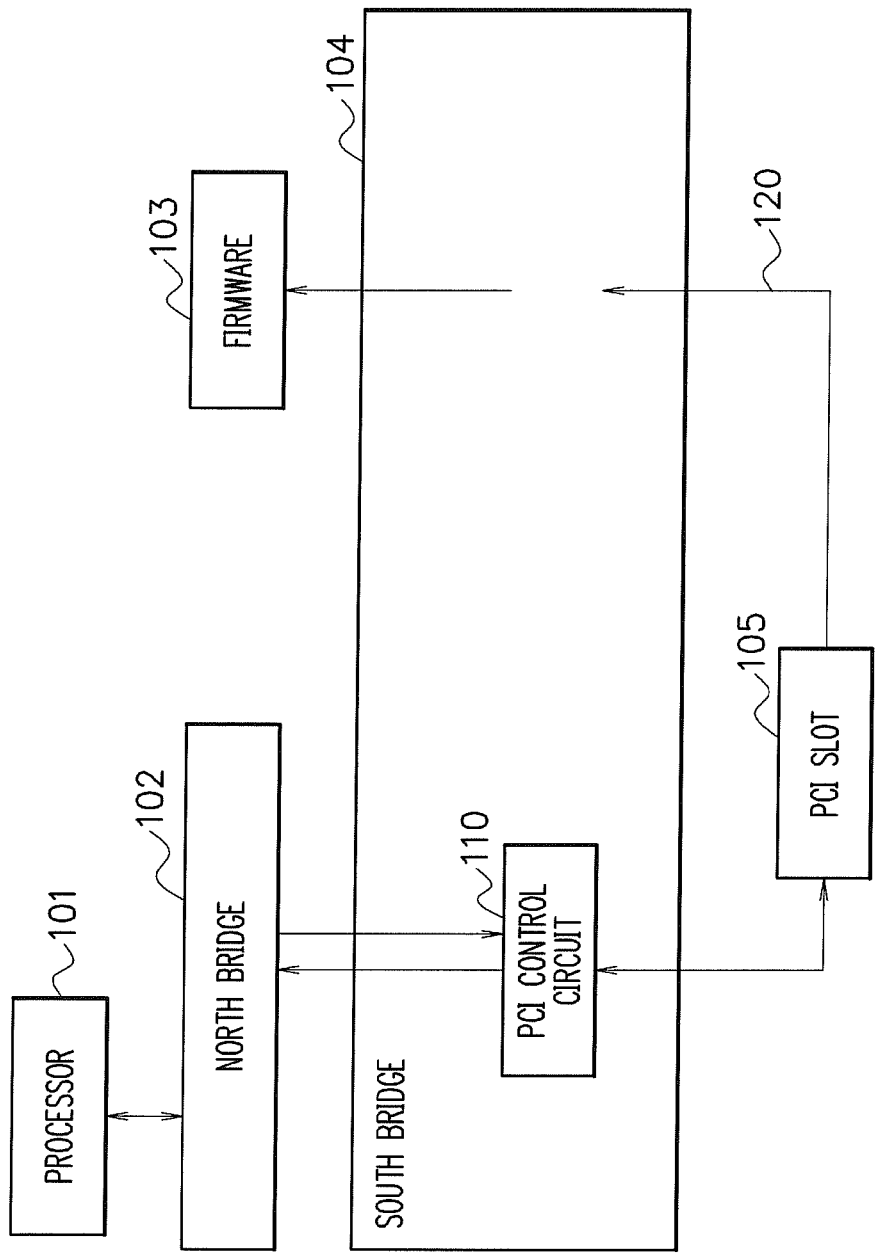
FIG. 7 is a block diagram illustrating a system including a PCI bus according to the present invention.
Figure 8:
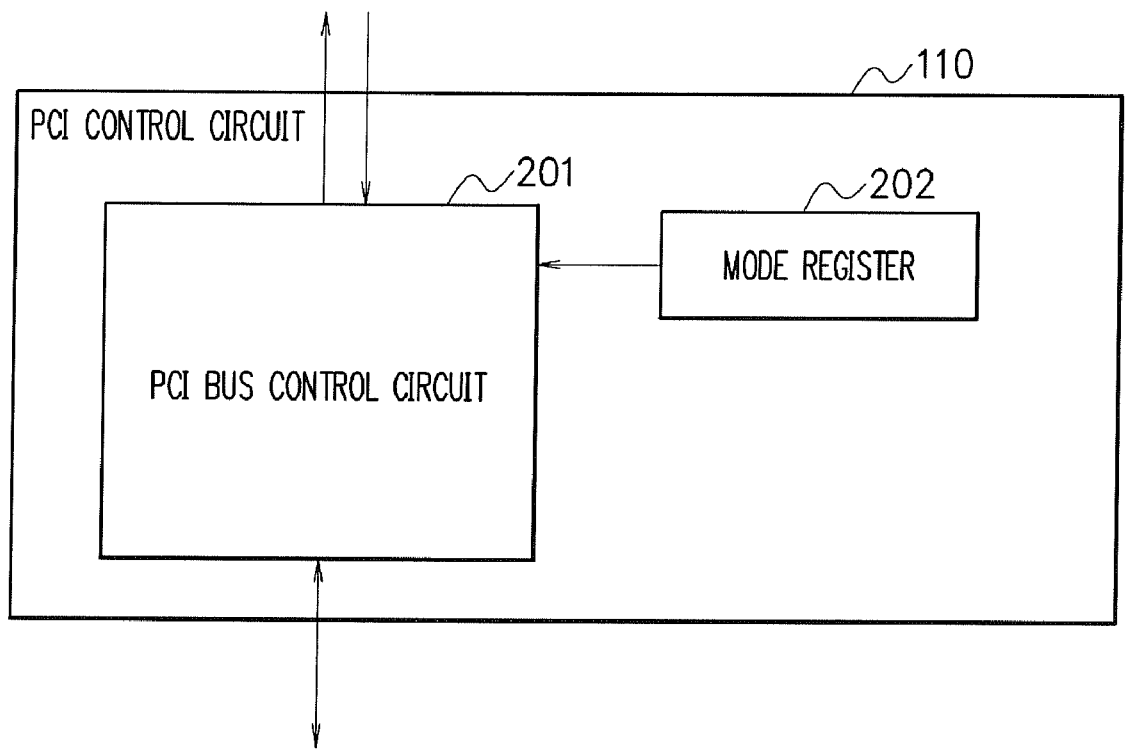
FIG. 8 is a block diagram illustrating a PCI control circuit according to the present invention.

FIG. 6 is a detailed diagram illustrating the configuration of the hot add control circuit 412 used in the system shown in FIG. 4.

In FIG. 6, the hot add control circuit 412 includes an interrupt control circuit 601 that interrupts for notifying the FW 403 of the hot add and a hot add detecting circuit 602 that detects the hot add of a PCI device to the PCI slot 405 on the basis of the electric acknowledge signal 420 from the PCI slot 405.

Although the second exemplary embodiment of the invention has been described above in detail, a detailed description of other functions of the processor 401, the NB 402, and the SB 404 will not be described here since such functions are well known to those skilled in the art and they are not directly related to the present invention.

Further, in this exemplary embodiment, a case, in which one PCI slot 405 is connected to the SB 404 shown in FIG. 4, is explained, however more number of slots may be connected to the SB 104. In this case, the number of hot add control circuits 412 and the number of mode registers 502 of the PCI control circuit 410 provided in the SB 404 shown in FIG. 4 may correspond to the number of PCI slots.

[Description of Operation]

The configuration of the system shown in FIG. 4 and the operation of the control circuits provided in the south bridge shown in FIGS. 5 and 6 will be described below.

When a PCI device is hot-added to the PCI slot 405 connected to the SB 404 while the system is being operated, it is notified to the SB 404 by the electric acknowledge signal 420. The SB 404 notified of hot add by the electronic acknowledge signal 420 recognizes the hot add of the PCI device to the PCI slot 405 by the hot add detecting circuit 602 in the hot add control circuit 412.

When the hot add is detected, it is notified to the interrupt control circuit 601 from the hot add detecting circuit 602, and interruption is performed to notify the FW 403 of the hot add of the PCI device to the PCI slot 405.

The FW 403 recognizing the hot add of the PCI device to the PCI slot 405 instructs the config read command issuing circuit 411 of the SB 404 to issue a config read command for reading the VID and DID of the PCI device on the PCI slot 405, and the config read command issuing circuit 411 requests the PCI bus control circuit 501 of the PCI control circuit 410 to issue the config read command.

The PCI bus control circuit 501 having received the request to issue the config read command waits until config access commands are issued from the processor 401 to the PCI device on the PCI slot 405. When the PCI device is hot-added to the PCI slot 405, a PCI hot plug controller interrupts the processor 401 to notify an OS or a hot plug driver that the PCI device is hot-added to the PCI slot 405.

When the hot add is notified, the OS and the hot plug driver set up the NB 402, the SB 404 and the PCI device on the PCI slot 405 in order to incorporate the PCI device on the PCI slot 405 into the system.

When the config access commands can be issued to the PCI device on the PCI slot 405 by setting up the OS or the hot plug driver, the config access commands are issued from the processor 401 to the PCI device on the PCI slot 405. The PCI bus control circuit 501 of the SB 404 on the path can recognize that the config access commands can be issued to the PCI device on the PCI slot 405 by receiving the config access commands transmitted from the processor 401 to the PCI device on the PCI slot 405.

Therefore, since the config read command issuing circuit 411 requests to issue the config read commands, the PCI bus control circuit 501 does not issue the config access commands from the processor 401 to the PCI bus by the config access retry control circuit 503, but returns a retry response to the processor 401 as an instruction to issue the commands again, and issues config read commands for reading the VID and DID of the PCI device on the PCI slot 405, which are from the command issuing circuit 411, to the PCI bus.

While the config read commands from the config read command issuing circuit 411 to the PCI device on the PCI slot 405 are issued, the config access commands, for which retry has been returned, is reissued from the processor 401. However, since the config read command from the config read command issuing circuit 411 is being processed, the config access retry control circuit 503 returns the retry response to the processor 401 again, and this process is continued until process of the config read command from the config read command issuing circuit 411 is completed.

When reply data in response to the config read command from the config read command issuing circuit 411 returned from the PCI device on the PCI slot 405, the PCI bus control circuit 501 outputs replay data to the config read command issuing circuit 411 to control the config access retry control circuit 503 to stop a retry process of config access from the processor 401 to the PCI device on the PCI slot 405. Then, the config access command received afterward from the processor 401 to the PCI device on the PCI slot 405 is normally output to the PCI bus, and then issued to the PCI device on the PCI slot 405. The config read command issuing circuit 411 forwards the reply data to the FW 403 having instructed to issue the config read command without any change.

The FW 403 recognizes the type of the PCI device that is hot-added to the PCI slot 405, on the basis of information of a vendor ID and a device ID included in the reply data. The FW 403 determines whether the support of the platform unique function is available and determines the support content on the basis of the recognized type of PCI device, and sets the mode of a support function of the mode register 502 in the PCI control circuit 410 of the SB 404. After the mode is set, the support of the platform unique function is available for the PCI device that is hot-added to the PCI slot 405.

[Description of Effects]

As described above, the invention has the following effects.

First effect is that the support of the platform unique function is available for the PCI device that is hot-added during an operation, without modifying an OS or an open hot plug driver, since the south bridge directly notifies the firmware of the hot add of a PCI device.

Second effect is that the firmware can determine a mode set value of the platform unique function only by referring to information in the south bridge, without directly accessing the PCI device, since a vendor ID or a device ID of the PCI device that is hot-added in the south bridge is automatically read.

Third effect is that the config read commands can be issued after it is checked that config access to the PCI device is available, since the issue of config read commands to the PCI device are suspended until the processor issues config access commands.

Fourth effect is that it is possible to support the hot add of a legacy PCI device that can process only one config access command, since the issue of the config access commands from the processor are retried until the issue of the config read commands from the south bridge is completed.

Further, the above-described exemplary embodiments are just illustrative examples, and the present invention is not limited thereto. Various modifications can be made without departing from the scope and spirit of the present invention.

The present invention includes the following characteristics on the basis of the above-described exemplary embodiments.

An exemplary embodiment of the present invention is a mode setting method in the hot plug of a PCI device including notifying the hot add of the PCI device to firmware from a south bridge.

According to the above-mentioned configuration, since the south bridge directly notifies the firmware of the hot add of a PCI device, the support of the platform unique function is available for the PCI device that is hot-added during an operation, without modifying an OS or an open hot plug driver.

Another exemplary embodiment of the mode setting method in the hot plug of a PCI device according to the present invention is the method of the above-mentioned exemplary embodiment, wherein a vendor ID or a device ID of the hot-added PCI device is automatically read.

According to the above-mentioned configuration, since the vendor ID or the device ID of the PCI device that is hot-added in the south bridge is automatically read, the firmware can determine a mode set value of the platform unique function only by referring to information in the south bridge, without directly accessing the PCI device.

Another exemplary embodiment of the mode setting method in the hot plug of a PCI device according to the present invention is the method of the above-mentioned exemplary embodiment, wherein the issue of a config read command to the PCI device is suspended until a config access command from a processor is received.

According to the above-mentioned configuration, since the issue of config read commands to the PCI device is suspended until the config access command from the processor is received, the config read commands can be issued after it is checked that config access to the PCI device is available.

Another exemplary embodiment of the mode setting method in the hot plug of a PCI device according to the present invention is the method of the above-mentioned exemplary embodiment, wherein the issue of the config access command from the processor may be retried until the issue of the config read command from the south bridge is completed.

According to the above-mentioned configuration, since the issue of the config access commands from the processor are retried until the issue of the config read commands from the south bridge is completed, it is possible to support the hot add of a legacy PCI device that can process only one config access command.

Another exemplary embodiment of a mode setting method in the hot plug of a PCI device according to the present invention is a method including: notifying the hot add of the PCI device at a south bridge of a system including a PCI bus to firmware from a south bridge; and automatically reading information of a vendor ID and a device ID of the hot-added PCI device, which is required for the mode setting, from the PCI device and transmitting the information to the firmware by the south bridge, thereby allowing to set the mode of a platform unique function to support the PCI device that is hot-added to the system.

According to the above-mentioned configuration, it is possible to set the mode of the platform unique function to support the PCI device that is hot-added to the system, without making a dedicated hot plug driver.

<System Including PCI Bus>

Another exemplary embodiment of a system including a PCI bus according to the present invention is the system including a mode setting unit that controls a south bridge to notify firmware that a PCI device is hot-added.

According to the above-mentioned configuration, since the south bridge directly notifies the firmware of the hot add of a PCI device, the support of the platform unique function is available for the PCI device that is hot-added during an operation, without modifying an OS or an open hot plug driver.

Another exemplary embodiment of the system including a PCI bus according to the present invention is the system of the above-mentioned exemplary embodiment, further including a unit that automatically reads a vendor ID or a device ID of the hot-added PCI device.

According to the above-mentioned configuration, since the vendor ID or the device ID of the PCI device that is hot-added in the south bridge is automatically read, the firmware can determine a mode set value of the platform unique function only by referring to information in the south bridge, without directly accessing the PCI device.

Another exemplary embodiment of the system including a PCI bus according to the present invention is the system of the above-mentioned exemplary embodiment further including a unit that suspends the issue of a config read command to the PCI device until a config access command from a processor is received.

According to the above-mentioned configuration, since the issue of config read commands to the PCI device is suspended until the config access command from the processor is received, the config read commands can be issued after it is checked that config access to the PCI device is available.

Another exemplary embodiment of the system having a PCI bus according to the present invention is the system of the above-mentioned exemplary embodiment further including a unit that retries the issue of the config access command from the processor until the issue of the config read command from the south bridge is completed.

According to the above-mentioned configuration, since the issue of the config access commands from the processor are retried until the issue of the config read commands from the south bridge is completed, it is possible to support the hot add of a legacy PCI device that can process only one config access command.

Another exemplary embodiment of a system including a PCI bus according to the present invention is a system including: a PCI bus; firmware; a PCI device; and a south bridge that notifies the firmware that the PCI device is hot-added, automatically reads information of a vendor ID and a device ID of the hot-added PCI device, which is required for mode setting, from the PCI device, and transmits the information to the firmware.

According to the above-mentioned configuration, since the south bridge directly notifies the firmware of the hot add of a PCI device, the support of the platform unique function is available for the PCI device that is hot-added during an operation, without modifying an OS or an open hot plug driver.

In these configurations, if the south bridge (hereinafter, referred to as SB) of the system includes a circuit for recognizing the insertion of a device into each PCI slot, a function that issues config read commands for reading a vendor ID (hereinafter, referred to as VID) and a device ID (hereinafter, referred to as DID) of the PCI device, registers that store the read VID and DID respectively and a function that performs interruption to notify the firmware (hereinafter, referred to as FW) of the completion of the config read and when a PCI device is hot-added to the PCI slot during an operation, the SB recognizes the hot add of the PCI device, and waits until the config access command is issued to the hot-add PCI device.

When the config access command is issued from the processor to the PCI device that is hot-added to the PCI slot, the SB can recognize that the setting of the target PCI device is completed to the condition that the config read command can be issued, and then the SB generates and issues the config read command for reading the VID and DID of the PCI device to the PCI device. At the time, while the config read command issued from the SB is processed, the config access command issued from the processor is not issued to the PCI bus but a retry request is returned to the processor since some PCI devices may process only one config access command.

Then, when the config access command that is reissued from the processor is received after the config read command from the SB is completed, it is normally processed. Data read from the PCI device by the config read command issued from the SB are stored in the VID and DID registers in the SB corresponding to each PCI slot. The SB transmits an interrupt request to the FW and then notifies the FW of the hot add of the PCI device. The FW having been notified of the hot add of the PCI device reads the VID and DID stored in the SB to determine whether the support of the various platform unique functions are available and determine set values thereof, and sets a mode register for the support functions of the SB.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A mode setting method in the hot plug of a PCI device, the method comprising:
   notifying the hot add of the PCI device to firmware from a south bridge,
   wherein issuance of a config access command from a processor is retried until issuance of a config read command from the south bridge has been completed.

2. The mode setting method in the hot plug of a PCI device according to claim 1, wherein a vendor ID or a device ID of the hot-added PCI device is automatically read.

3. The mode setting method in the hot plug of a PCI device according to claim 1, wherein the issuance of the config read command to the PCI device is suspended until the config access command from the processor is received.

4. A mode setting method in the hot plug of a PCI device, the method comprising:

notifying that the PCI device is hot added at a south bridge of a system including a PCI bus to firmware from a south bridge; and automatically reading information of a vendor ID and a device ID of the hot-added PCI device, which is required for mode setting, from the PCI device and transmitting the information to the firmware by the south bridge, thereby allowing to set the mode of a platform unique function to support the PCI device that is hot-added to the system, wherein issuance of a config access command from a processor is retried until issuance of a config read command from the south bridge has been completed.

5. A system including a PCI bus, the system comprising:
a mode setting unit that controls a south bridge to notify firmware that a PCI device is hot-added; and,
a unit that suspends issuance of a config read command to the PCI device until a config access command from a processor is received.

6. The system including a PCI bus according to claim 5, further comprising;

a unit that automatically reads a vendor ID or a device ID of the hot-add PCI device.

7. The system including a PCI bus according to claim 5, further comprising:
a unit that retries issuance of the config access command from the processor until the issuance of the config read command from the south bridge is completed.

8. A system including a PCI bus comprising:
a PCI bus;
firmware;
a PCI device; and
a south bridge that notifies the firmware that the PCI device is hot-added, automatically reads information of a vendor ID and a device ID of the hot-added PCI device, which is required for mode setting, from the PCI device, and transmits the information to the firmware,
wherein issuance of a config access command from a processor is retried until issuance of a config read command from the south bridge has been completed.

* * * * *